United States Patent
Shamoto et al.

(10) Patent No.: US 11,440,147 B2
(45) Date of Patent: Sep. 13, 2022

(54) METHOD OF MANUFACTURING CUTTING TOOL

(71) Applicants: NATIONAL UNIVERSITY CORPORATION TOKAI NATIONAL HIGHER EDUCATION AND RESEARCH SYSTEM, Nagoya (JP); NAGOYA INSTITUTE OF TECHNOLOGY, Nagoya (JP)

(72) Inventors: Eiji Shamoto, Nagoya (JP); Fumihiro Itoigawa, Nagoya (JP)

(73) Assignees: National University Corporation Tokai National Higher Education and Research System, Nagoya (JP); Nagoya Institute of Technology, Nagoya (JP)

( * ) Notice: Subject to any disclaimer, the term of this patent is extended or adjusted under 35 U.S.C. 154(b) by 0 days.

(21) Appl. No.: 16/800,261

(22) Filed: Feb. 25, 2020

(65) Prior Publication Data
US 2020/0269366 A1    Aug. 27, 2020

Related U.S. Application Data

(63) Continuation of application No. PCT/JP2019/007030, filed on Feb. 25, 2019.

(51) Int. Cl.
*B23D 63/00* (2006.01)
*B23D 63/08* (2006.01)
(Continued)

(52) U.S. Cl.
CPC .............. *B23P 15/24* (2013.01); *B23B 27/14* (2013.01); *B23D 63/00* (2013.01); *B23D 63/008* (2013.01);
(Continued)

(58) Field of Classification Search
None
See application file for complete search history.

(56) References Cited

U.S. PATENT DOCUMENTS

| 4,141,260 A | * | 2/1979 | Bertini | B23D 65/00 |
| | | | | 72/301 |
| 6,289,767 B1 | * | 9/2001 | Cookson | B23D 65/00 |
| | | | | 76/112 |

(Continued)

FOREIGN PATENT DOCUMENTS

| DE | 34 44 904 A1 | * | 6/1986 | ............. B23D 65/00 |
| DE | 10 2006 021 759 B3 | * | 10/2007 | ............. B23D 65/00 |

(Continued)

OTHER PUBLICATIONS

Written Opinion dated Mar. 3, 2020 in corresponding PCT Application No. PCT/JP2019/007030.
(Continued)

*Primary Examiner* — Clark F Dexter
(74) *Attorney, Agent, or Firm* — Muncy, Geissler, Olds & Lowe, P.C.

(57) ABSTRACT

A controller performs a first process of scanning a cylindrical irradiation region including a focused spot of laser light emitted from a laser light emitter to machine a flank face side of a workpiece to manufacture a cutting tool having a plurality of cutting edges arranged in line. In the first process, the controller scans the cylindrical irradiation region along a scanning path that has periodicity and changes a machining depth to form the plurality of cutting edges. The controller further performs a second process of scanning the cylindrical irradiation region including the focused spot of the laser light emitted in a direction different from an irradiation direction of the laser light in the first process to machine a rake face side of the workpiece.

4 Claims, 7 Drawing Sheets

(51) Int. Cl.
    *B23D 65/00*     (2006.01)
    *B23K 26/00*     (2014.01)
    *B23K 26/082*     (2014.01)
    *B23K 26/38*     (2014.01)
    *B23K 26/50*     (2014.01)
    *B23P 15/24*     (2006.01)
    *B23B 27/14*     (2006.01)

(52) U.S. Cl.
    CPC .............. *B23D 63/08* (2013.01); *B23D 65/00* (2013.01); *B23K 26/38* (2013.01); *B23K 26/50* (2015.10); *B23B 2226/31* (2013.01)

(56) References Cited

U.S. PATENT DOCUMENTS

| | | | | |
|---|---|---|---|---|
| 2008/0072411 | A1* | 3/2008 | Ahorner et al. ....... | B23D 61/12 29/415 |
| 2014/0190328 | A1* | 7/2014 | Karlen ................... | B23D 65/00 83/853 |
| 2017/0120357 | A1* | 5/2017 | Trautner et al. ..... | B23D 61/121 |
| 2017/0297124 | A1* | 10/2017 | Rakurty et al. ........ | B23D 61/14 |
| 2018/0056415 | A1* | 3/2018 | Clark et al. .......... | B23D 61/121 |
| 2018/0099341 | A1* | 4/2018 | Rakurty et al. ...... | B23D 61/123 |

FOREIGN PATENT DOCUMENTS

| | | |
|---|---|---|
| JP | 2003-145344 A | 5/2003 |
| JP | 2013-40436 A | 2/2013 |
| JP | 2016-159318 A | 9/2016 |
| JP | 2018-8363 A | 1/2018 |

OTHER PUBLICATIONS

Written Opinion dated Apr. 23, 2019 in corresponding PCT Application No. PCT/JP2019/007030.

Liu et al., "Daimond turning of high-precision roll-to-roll imprinting molds for fabricating subwavelength gratings," Optical Engineering, vol. 55, No. 6, Jun. 2016, 7 pages.

Saito et al., "Mirror Surfact Machining of Steel by Elliptical Vibration Cutting with Diamond-Coated Tools Sharpened by Pulse Laser Grinding," Int. J. of Automation Technology, vol. 12, No. 4, 2018, 9 pages.

Sun et al., "Febrication of periodic nanostructures by single-point diamond turning with focused ion beam built took tips," Journal of Micromechanics and Microengineering, vol. 22, 2012, 11 pages.

\* cited by examiner

METHOD OF MANUFACTURING CUTTING TOOL

CROSS-REFERENCE TO RELATED APPLICATIONS

This application is based upon and claims the benefit of priority from the International Application No. PCT/JP2019/007030, filed on Feb. 25, 2019, the entire contents of which are incorporated herein by reference.

BACKGROUND

1. Field of Disclosure

The present disclosure relates to a method of manufacturing a cutting tool having a plurality of cutting edges arranged in line.

2. Description of the Related Art

In known cutting work for creating periodic fine grooves with submicron to micron order pitches, a monocrystalline diamond tool is used. Non-patent document 1 discloses periodic fine grooves that are made by using a monocrystalline diamond tool having a single point sharply ground to transfer the point shape to hard copper at a pick feed of submicron order. Non-patent document 2 discloses a technique of cutting a surface of a to-be-cut object with four fine protrusions (cutting edges) that are periodically formed on a monocrystalline diamond tool using a focused ion beam.

Patent document 1 discloses pulsed laser grinding in which surface machining is performed by concentrating pulsed laser light at a relatively large angle and scanning a cylindrical irradiation region including a focused spot over a surface of a workpiece. Specifically, patent document 1 discloses a method of overlapping an irradiation region of pulsed laser light that extends in a cylindrical shape and has energy enough to make machining with a surface-side portion of a to-be-machined object and scanning the irradiation region at a speed that allows machining to remove a surface region of the to-be-machined object. Non-patent document 3 discloses a technique of machining a flank face of a tool base material in two directions by pulsed laser grinding to form a V-shaped cutting edge.

CITATION LIST

Patent Document

[patent document 1] JP2016-159318 A

Non-Patent Document

[non-patent document 1] Chun-Wei Liu, Jiwang Yan, and Shih-Chieh Lin, "Diamond turning of high-precision roll-to-roll imprinting molds for fabricating subwavelength gratings", Optical Engineering 55 (6), 064105, June 2016
[non-patent document 2] J. Sun, et al., "Fabrication of periodic nanostructures by single-point diamond turning with focused ion beam built tool tips", Journal of micromechanics and microengineering. 22 (2012) 115014 (11 pp)
[non-patent document 3] Hiroshi Saito, Hongjin Jung, Eiji Shamoto, Shinya Suganuma, and Fumihiro Itoigawa; "Mirror Surface Machining of Steel by Elliptical Vibration Cutting with Diamond-Coated Tools Sharpened by Pulse Laser Grinding", International Journal of Automation Technology, Vol. 12, No. 4, pp. 573-581 (2018)

SUMMARY

Since the monocrystalline diamond tool shown in non-patent document 1 has only a single point, machining efficiency when creating periodic fine grooves is low. Since the monocrystalline diamond tool shown in non-patent document 2 has four periodic cutting edges, setting the pick feed to a length equivalent to four pitches allows periodic fine grooves to be created with machining efficiency four times higher than a single cutting edge. However, the use of the focused ion beam for forming a plurality of cutting edges has a disadvantage in that a tool manufacturing cost increases. The present disclosure pays attention to the fact that pulsed laser grinding can be performed at low cost and has come up with a method of periodically creating a plurality of cutting edges by pulsed laser grinding.

The present disclosure has been made in view of such circumstances, and it is therefore an object of the present disclosure is to provide a new method of manufacturing a cutting tool having a plurality of cutting edges arranged in line.

In order to solve the above-described problems, one aspect of the present invention relates to a method of manufacturing a cutting tool having a plurality of cutting edges arranged in line by machining a workpiece. This method includes a process of scanning a cylindrical irradiation region including a focused spot of laser light that has been emitted to machine a flank face side of the workpiece. In this process, the cylindrical irradiation region is scanned along a scanning path that has periodicity and changes a machining depth to form a plurality of cutting edges.

BRIEF DESCRIPTION OF THE DRAWINGS

The figures depict one or more implementations in accordance with the present teaching, by way of example only, not by way of limitations. In the figures, like reference numerals refer to the same or similar elements.

DETAILED DESCRIPTION

Figure 1:
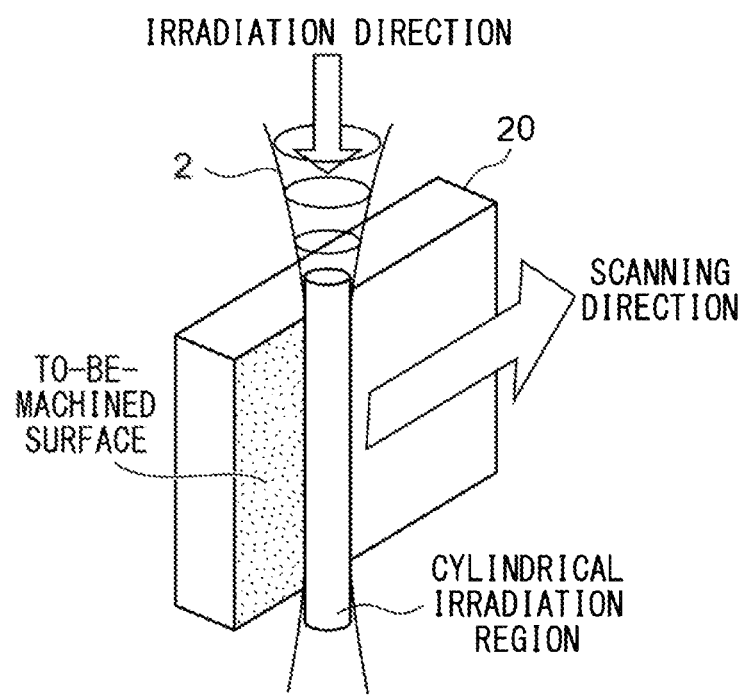
FIG. 1 is a diagram for describing pulsed laser grinding.

FIG. 1 is a diagram for describing pulsed laser grinding. As disclosed in patent document 1, the pulsed laser grinding is a machining method of overlapping a cylindrical irradiation region extending in an optical axis direction of laser light 2 and having energy enough to make machining with a surface of a workpiece 20 and scanning the cylindrical irradiation region in a direction intersecting the optical axis to remove a surface region of the workpiece 20 where the cylindrical irradiation region has passed. In the pulsed laser grinding, a surface parallel to the optical axis direction and scanning direction is formed on the surface of the workpiece 20.

Figure 2:
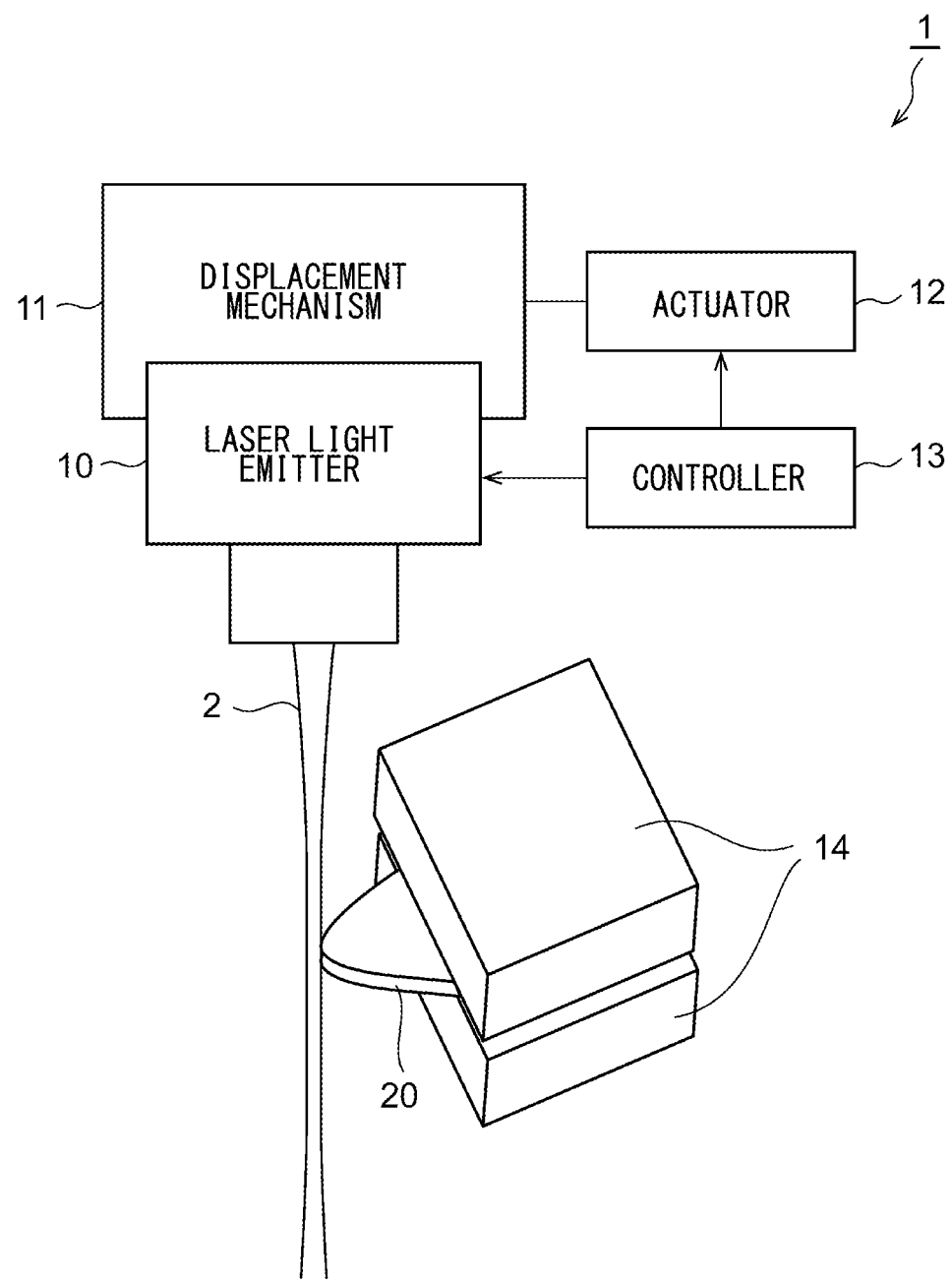
FIG. 2 is a diagram showing a schematic structure of a laser machining apparatus.

FIG. 2 shows a schematic structure of a laser machining apparatus 1. The laser machining apparatus 1 includes a laser light emitter 10 that emits the laser light 2, a support device 14 that supports the workpiece 20, a displacement mechanism 11 that enables the laser light emitter 10 to be displaced relative to the workpiece 20, an actuator 12 that actuates the displacement mechanism 11, and a controller 13 that collectively controls operation of the laser machining apparatus 1.

The laser light emitter 10 includes components such as a laser oscillator that generates laser light, an attenuator that adjusts output of the laser light, and a beam expander that adjusts a diameter of the laser light, and is structured to output, through an optical lens, the laser light that has passed through the components. For example, the laser oscillator may generate Nd:YAG pulsed laser light.

The displacement mechanism 11 according to an embodiment has a mechanism for changing a location and position of the laser light emitter 10 relative to the workpiece 20. The displacement mechanism 11 may have at least a link mechanism. The actuator 12 actuates the displacement mechanism 11 in response to a command from the controller 13 to change the location and position of the laser light emitter 10. Note that the displacement mechanism 11 may have a mechanism for changing a location and position of the support device 14 relative to the laser light emitter 10. In any case, the displacement mechanism 11 has a mechanism for changing a relative location and position between the laser light emitter 10 and the support device 14.

The controller 13 includes a CPU that controls laser light emission from the laser light emitter 10 and drive of the actuator 12. The controller 13 controls the laser light emitter 10 and the actuator 12 in accordance with a machining program for manufacturing a cutting tool having a plurality of cutting edges arranged in line.

Figure 3:
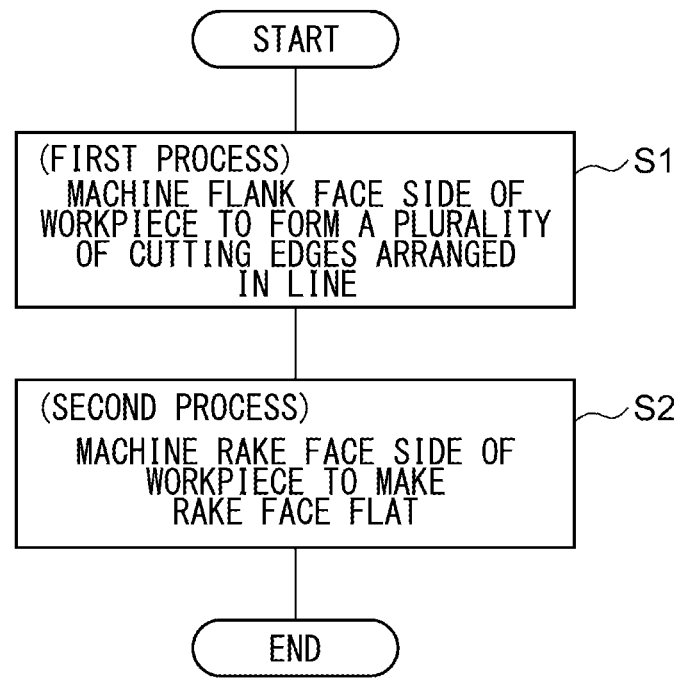
FIG. 3 is a diagram showing a procedure of a method of manufacturing a cutting tool having a plurality of cutting edges arranged in line.

FIG. 3 shows a procedure of a method of manufacturing a cutting tool having a plurality of cutting edges arranged in line. The controller 13 performs a first process (S1) of scanning a cylindrical irradiation region including a focused spot of the laser light 2 emitted from the laser light emitter 10 to machine a flank face side of the workpiece 20 and a second process (S2) of scanning the cylindrical irradiation region including the focused spot of the laser light emitted in a direction different from an irradiation direction of the laser light in the first process to machine a rake face side of the workpiece 20 to manufacture a cutting tool. The controller 13 may perform the first process and the second process in this order, but may perform the first process and the second process in reverse order.

Figure 4:
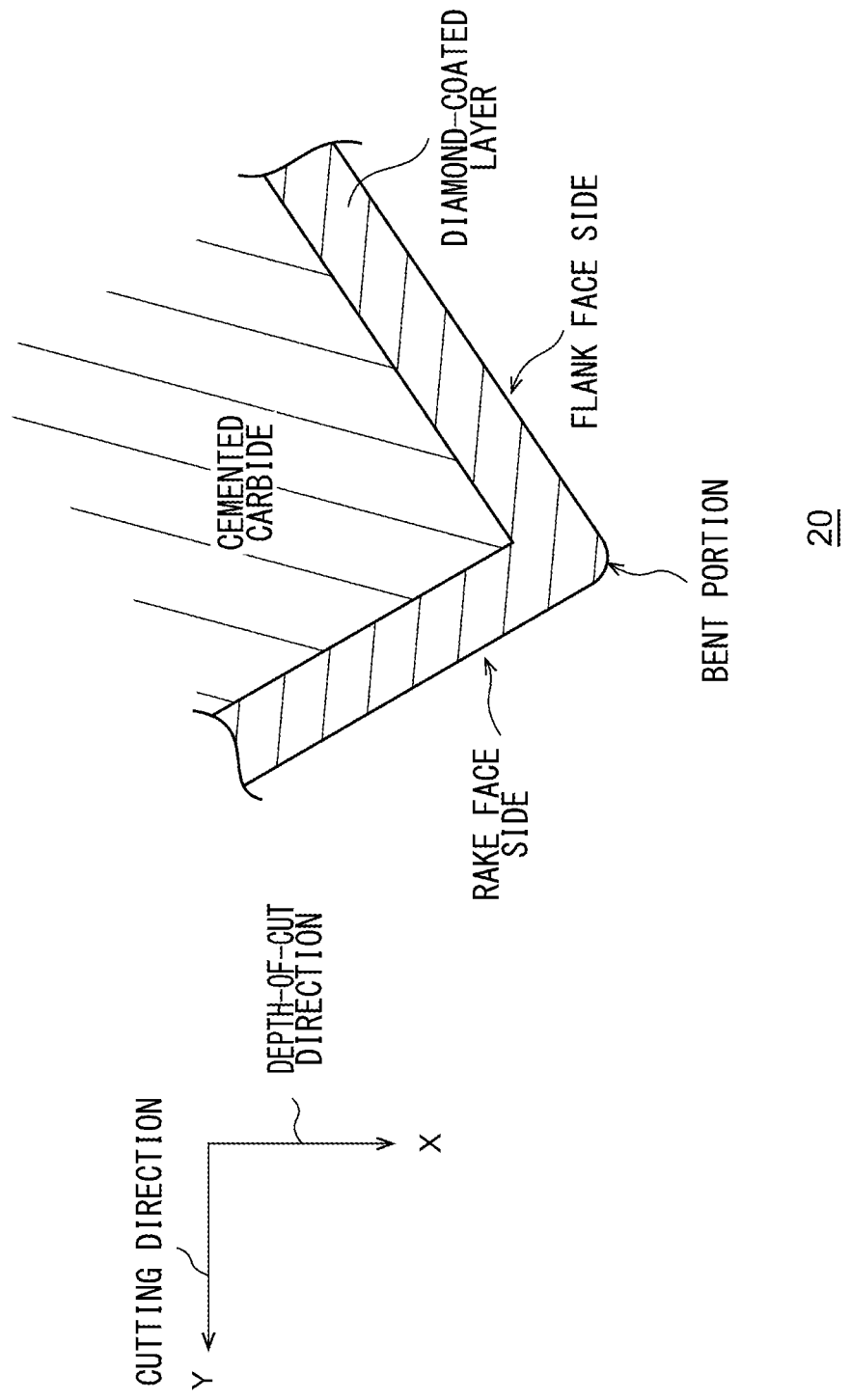
FIG. 4 is a diagram showing an example of a workpiece.

FIG. 4 shows an example of the workpiece 20. According to the embodiment, the workpiece 20 that results from diamond-coating a tool base material made of cemented carbide is machined to manufacture a cutting tool having a plurality of cutting edges arranged in line. Since a diamond-coated layer is higher in laser light energy absorption rate than monocrystalline diamond, CBN, or the like, it is possible for pulsed laser grinding to produce cutting edges with high efficiency. Further, since the diamond-coated layer is less liable to damage and high in hardness, there is an advantage that sharp cutting edge tips can be easily produced at low cost.

In FIG. 4, an X-axis direction corresponds to a depth-of-cut direction in a cutting process using a cutting tool manufactured by machining the workpiece 20, and a Y-axis direction corresponds to a cutting direction in the cutting process. Therefore, of the workpiece 20, a surface provided in a direction opposite to the cutting direction from a bent portion where cutting edges are formed is referred to as a "flank face", and a surface provided from the bent portion in the cutting direction is referred to as a "rake face". In the first process, pulsed laser grinding is applied to the flank face side to form a plurality of cutting edges and a flank face, and in the second process, pulsed laser grinding is applied to the rake face side to form a flat rake face. In the first process and the second process, the scanning direction of the pulsed laser light has at least a component in a Z-axis direction orthogonal to the X axis and the Y axis.

Figure 5:
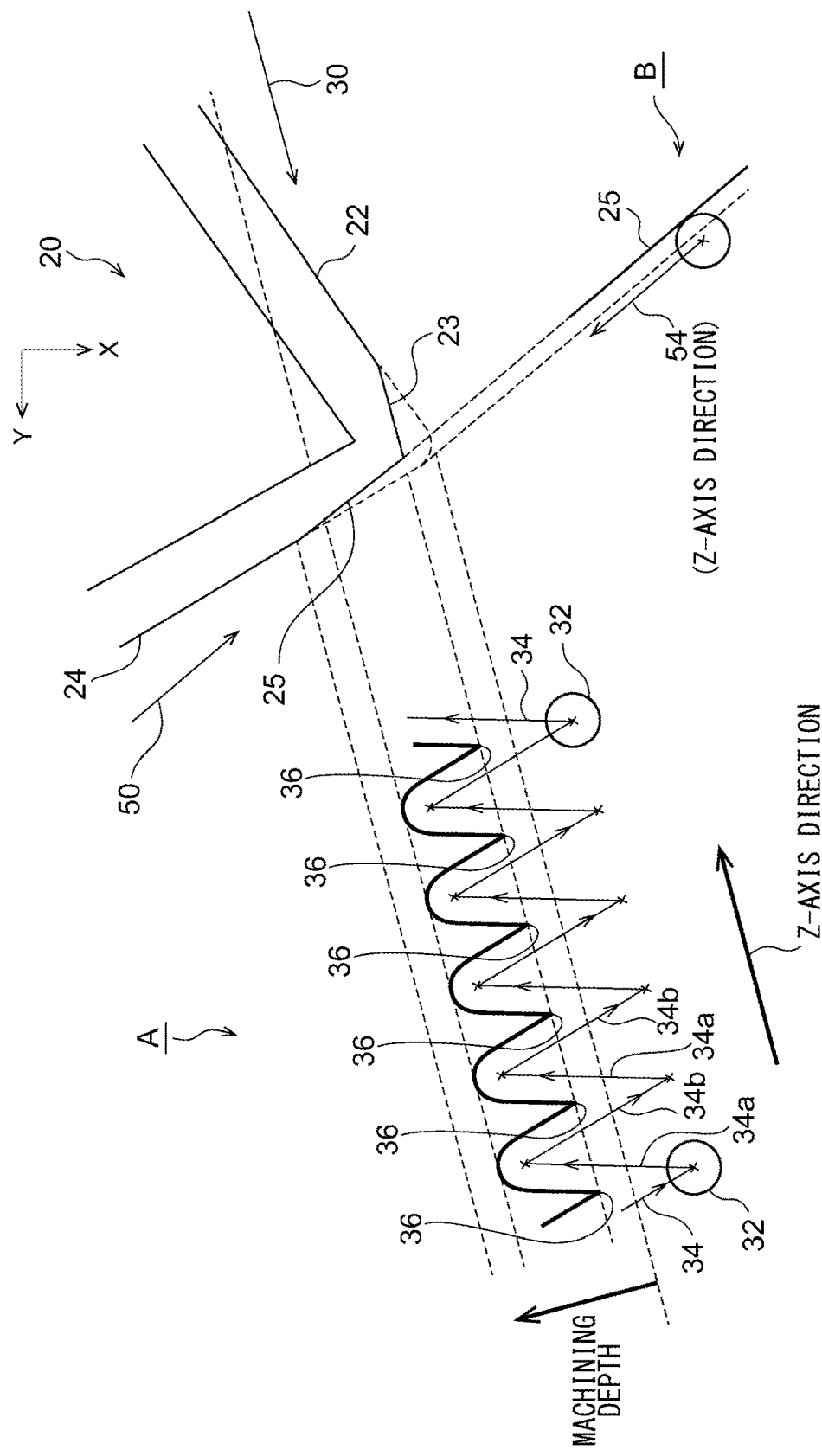
FIG. 5 is a diagram for describing a first process and a second process.

FIG. 5 is a diagram for describing the first process and the second process.

First Process

An explanatory diagram A is a diagram for describing the first process. In the first process, the controller 13 controls the actuator 12 to actuate the displacement mechanism 11 such that the direction of the optical axis of the laser light 2 coincides with a first irradiation direction 30 to adjust the relative location between the laser light emitter 10 and the workpiece 20. Note that, during scanning of the irradiation region of the laser light, the first irradiation direction 30, that is, the direction of the optical axis of the laser light 2 may be changed.

The controller 13 controls the actuator 12 to scan the cylindrical irradiation region of the laser light 2 along a scanning path 34 that has periodicity and changes a machining depth to form a plurality of cutting edges. The scanning path 34 may be defined as a movement path of a center of the most focused laser spot. FIG. 5 shows a state where the center of a laser spot 32 is moved on the scanning path 34 to remove a region of the workpiece 20 where the laser spot 32 has passed.

The scanning path 34 having periodicity may result from alternately connecting a first path 34a on which the cylindrical irradiation region is moved relative to the workpiece 20 in a direction in which the machining depth increases and a second path 34b on which the cylindrical irradiation region is moved relative to the workpiece 20 in a direction in which the machining depth decreases. The length and direction of the first path 34a and the second path 34b are determined such that the first path 34a and the second path 34b are periodically repeated to form cutting edge tips 36 that are sharp points formed when a scanning route of the cylindrical irradiation region is switched from the second path 34b to the first path 34a. When the scanning route of the cylindrical irradiation region is switched from the first path 34a to the second path 34b, a circular shape of the laser spot 32 partially remains between the cutting edges.

Setting the scanning path 34 to a periodic wavy path allows a plurality of cutting edges having the cutting edge tips 36 arranged at equal intervals (pitches) to be formed. In an example shown in FIG. 5, the scanning path 34 is set in a triangular wave shape, but may be set in a sawtooth shape. The first path 34a and/or the second path 34b need not have a linear shape, but may have a curved shape.

Second Process

An explanatory diagram B is a diagram for describing the second process. In the second process, the controller 13 controls the actuator 12 to actuate the displacement mechanism 11 such that the direction of the optical axis of the laser light 2 coincides with a second irradiation direction 50 to adjust the relative location between the laser light emitter 10 and the workpiece 20. In the second process, during scanning of the irradiation region of the laser light, the second irradiation direction 50, that is, the direction of the optical axis of the laser light 2 does not change.

Figure 6:
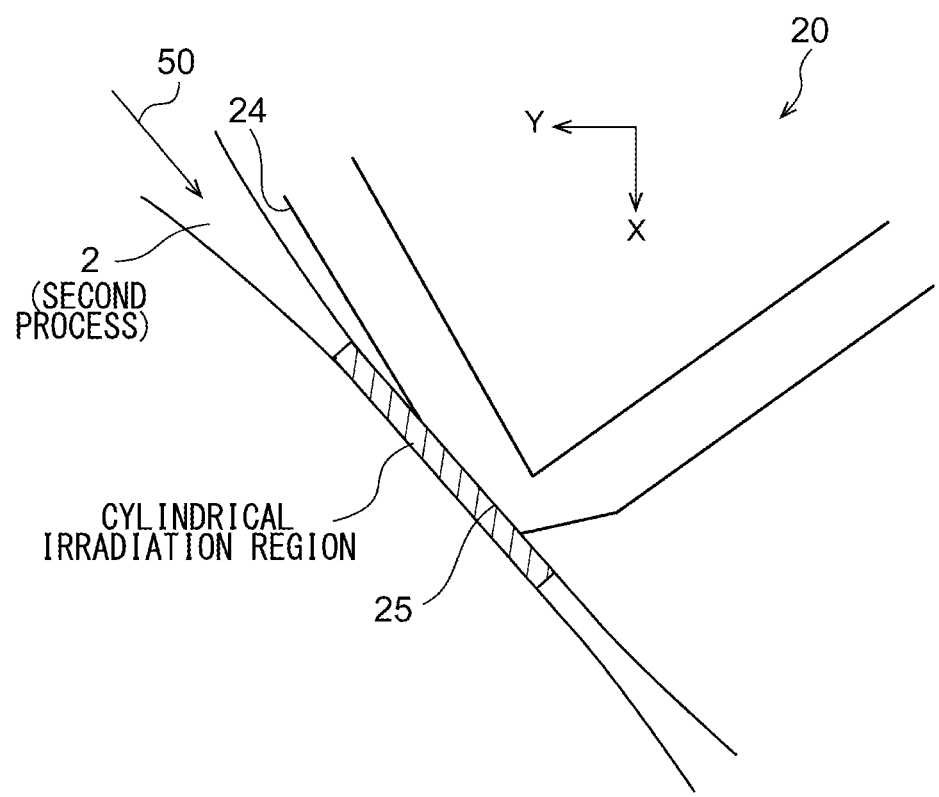
FIG. 6 is a diagram showing machining work in the second process.

FIG. 6 shows how a yet-to-be-machined rake face 24 is partially removed by pulsed laser grinding in the second process. The cylindrical irradiation region including the focused spot of the laser light 2 is overlapped with the yet-to-be-machined rake face 24 and is scanned over a scanning path 54 extending in the Z-axis direction at a speed that allows machining to form a machined rake face 25.

Note that, in the first process, the controller 13 secures a clearance angle from a finished surface by inclining the first irradiation direction 30 from the Y-axis direction while making the first irradiation direction 30 parallel to an XY plane. Further, in order to set a clearance angle in the Z-axis direction, the controller 13 may incline the first irradiation direction 30 from the XY plane.

During scanning the laser light 2 over the first path 34a, in order to form the clearance angle in the Z-axis direction on the cutting edges, the controller 13 may incline the optical axis clockwise a few degrees (for example, five degrees) from a traveling direction of the first path 34a. This causes the cylindrical irradiation region to set the clearance angle in the Z-axis direction. Similarly, during scanning the laser light 2 over the second path 34b, in order to form a clearance angle in the Z-axis direction on the cutting edges, the controller 13 inclines the optical axis clockwise a few degrees (for example, five degrees) from a traveling direction of the second path 34b. This causes the cylindrical irradiation region to set the clearance angle in the Z-axis direction. As described above, the controller 13 can set the clearance angle in the Z-axis direction by making the irradiation direction of the laser light 2 different between the first path 34a and the second path 34b.

Note that when the workpiece 20 is machined deeper than the diamond-coated layer by the cylindrical irradiation region of the laser light 2 in the first process, the base material made of cemented carbide is exposed from recesses between the cutting edge tips 36, but the exposed cemented carbide is not used as a cutting edge. In a cutting tool manufactured according to the embodiment, a hard diamond-coated layer remains on the cutting edge tips 36 and the machined rake face 25, and in particular, a diamond-coated layer also remains on a flank face side of cutting edges to be used for fine cutting with a depth smaller than a thickness of the coated layer left on the sharp cutting edge tips 36, which allows cutting using the fine cutting edge tips 36. This allows a thin diamond-coated layer to be formed on the workpiece 20 and thus makes it possible to reduce material cost.

Figure 7:
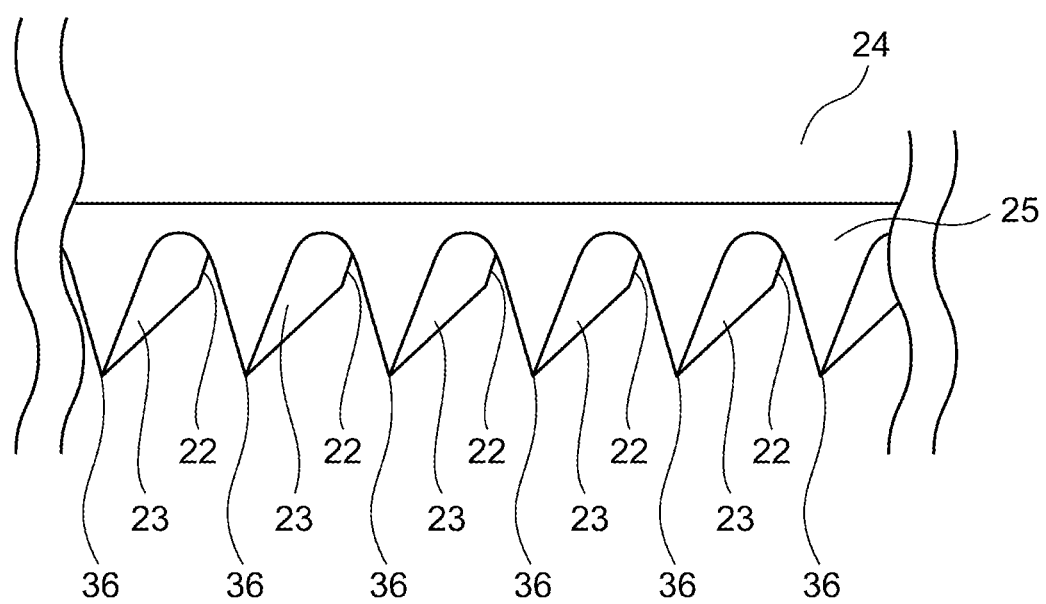
FIG. 7 is a diagram showing a structure around cutting edges of a manufactured cutting tool.

FIG. 7 shows a structure around the cutting edges of the manufactured cutting tool. The cutting tool has the plurality of cutting edge tips 36 and machined flank faces 23 formed periodically in the first process, and the machined rake faces 25 made flat in the second process. As shown in FIG. 7, each machined flank face 23 is continuous with a corresponding yet-to-be-machined flank face 22, and the machined rake face 25 is continuous with the yet-to-be-machined rake face 24. The above-described clearance angle in the Z-axis direction is formed when the rake face 25 and the flank faces 23 form an acute angle. According to the embodiment, it is possible to manufacture a cutting tool having a plurality of cutting edges arranged in line at low cost.

The present disclosure has been described on the basis of the example. It is to be understood by those skilled in the art that the example is illustrative, various modifications are possible for a combination of components or processes, and such modifications are also within the scope of the present disclosure.

According to the embodiment, the workpiece 20 is machined to have the plurality of cutting edge tips 36 arranged in line, but the workpiece 20 may be machined to have the plurality of cutting edge tips 36 arranged in an arc shape. Further, according to the embodiment, the workpiece 20 that results from diamond-coating the base material made of cemented carbide is used, but a different type of material such as monocrystalline diamond, CBN, polycrystalline diamond, or nano-polycrystalline diamond may be used.

The outline of aspects of the present disclosure is as follows. One aspect of the present disclosure is a method of manufacturing a cutting tool having a plurality of cutting edges arranged in line by machining a workpiece, the method including a process of scanning a cylindrical irradiation region including a focused spot of laser light that has been emitted to machine a flank face side of the workpiece. In this process, the cylindrical irradiation region is scanned along a scanning path that has periodicity and changes a machining depth to form a plurality of cutting edges.

In the process, scanning the cylindrical irradiation region on the flank face side of the workpiece while changing the machining depth makes it possible to periodically form the plurality of cutting edges on the workpiece. In the process, the plurality of cutting edges may be formed to have cutting edge tips arranged at equal intervals.

The scanning path having periodicity may result from alternately connecting a first path on which the cylindrical irradiation region is moved relative to the workpiece in a direction in which the machining depth increases and a second path on which the cylindrical irradiation region is moved relative to the workpiece in a direction in which the machining depth decreases. The scanning path that has periodicity and changes the machining depth may be formed by alternately connecting the first path and the second path. The scanning path may be a periodic wavy path.

The irradiation direction of the laser light may be different between the first path and the second path. Making the irradiation direction of the laser light different between the paths makes it possible to set the clearance angle on the flank face connecting to the rake face. The method of manufacturing a cutting tool may further include a process of scanning the cylindrical irradiation region including the focused spot of the laser light emitted in a direction different from an irradiation direction of the laser light in the process to machine a rake face side of the workpiece. The workpiece may be a material that results from diamond-coating a tool base material.

What is claimed is:

1. A method of manufacturing a cutting tool having a plurality of cutting edges arranged in line by machining a workpiece, the method comprising:
   a process of scanning a cylindrical irradiation region including a focused spot of laser light that has been emitted in an irradiation direction to machine a flank face side of the workpiece, wherein
   in the process, the cylindrical irradiation region is scanned along a scanning path that has periodicity and changes a machining depth to form the plurality of cutting edges, and
   the scanning path having periodicity results from alternately connecting a first path on which the cylindrical irradiation region is moved relative to the workpiece in a direction in which the machining depth increases and a second path on which the cylindrical irradiation region is moved relative to the workpiece in a direction in which the machining depth decreases, the irradiation direction of the laser light being different between the first path and the second path.

2. The method of manufacturing a cutting tool according to claim 1, wherein
in the process, the plurality of cutting edges are formed to have cutting edge tips arranged at equal intervals.

3. The method of manufacturing a cutting tool according to claim 1, wherein the scanning path is a periodic wavy path.

4. The method of manufacturing a cutting tool according to claim 1, wherein the workpiece is a material that results from diamond-coating a tool base material.

* * * * *